(12) United States Patent
Chavan et al.

(10) Patent No.: US 7,983,257 B2
(45) Date of Patent: Jul. 19, 2011

(54) HARDWARE SWITCH FOR HYPERVISORS AND BLADE SERVERS

(75) Inventors: Mukund Chavan, Costa Mesa, CA (US); Parag Bhide, Costa Mesa, CA (US); Chaitanya Tumuluri, Costa Mesa, CA (US); Ravindra Sadanand Shenoy, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 376 days.

(21) Appl. No.: 12/176,266

(22) Filed: Jul. 18, 2008

(65) Prior Publication Data

US 2010/0014526 A1 Jan. 21, 2010

(51) Int. Cl.
*H04L 12/28* (2006.01)
*H04L 12/56* (2006.01)
(52) U.S. Cl. .................. 370/389; 370/395.53; 711/100; 711/108
(58) Field of Classification Search .................. None
See application file for complete search history.

(56) References Cited

U.S. PATENT DOCUMENTS 6,249,521 B1 * 6/2001 Kerstein .................. 370/389
2007/0067432 A1 * 3/2007 Tarui et al. .................. 709/223
* cited by examiner

*Primary Examiner* — Chirag G Shah
*Assistant Examiner* — Minh-Trang Nguyen
(74) *Attorney, Agent, or Firm* — Morrison & Foerster LLP

(57) ABSTRACT

A hardware switch for use with hypervisors and blade servers is disclosed. The hardware switch enables switching to occur between different guest OSs running in the same server, or between different servers in a multi-root IOV system, or between different guest OSs running in the same server in single-root IOV systems. Whether embedded in a host bus adapter (HBA), converged network adapter (CNA), network interface card (NIC) or other similar device, the hardware switch can provide fast switching with access to and sharing of at least one external network port such as a Fibre Channel (FC) port, 10 Gigabit Ethernet (10 GbE) port, FC over Ethernet (FCoE) port, or other similar port. The hardware switch can be utilized when no hypervisor is present or when one or more servers have hypervisors, because it allows for switching (e.g. Ethernet switching) between the OSs on a single hypervisor.

33 Claims, 9 Drawing Sheets

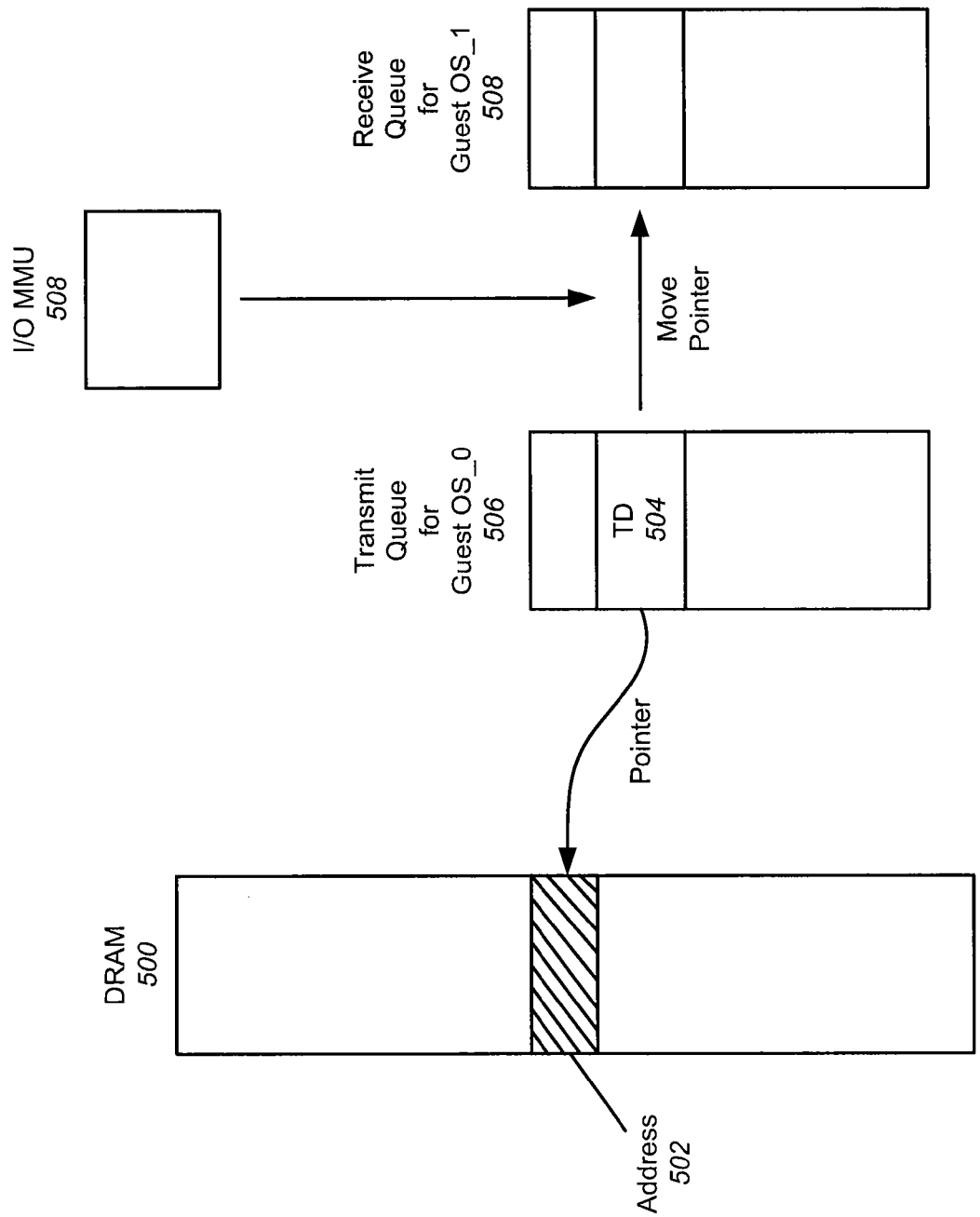

HARDWARE SWITCH FOR HYPERVISORS AND BLADE SERVERS

FIELD OF THE INVENTION

This invention relates generally to switching in server-connected networks, and in particular to a hardware switch for use with hypervisors and blade servers.

BACKGROUND OF THE INVENTION

For a server that runs more than one guest operating system (OS) or virtual machine (VM), a hypervisor can abstract access to an external Ethernet network by implementing an emulated network interface card (NIC) or virtual NIC (vNIC) and presenting it as a regular NIC to each guest OS. The hypervisor can talk to a physical NIC (pNIC) and "translate" access from the vNIC to the pNIC. In the process, the hypervisor can add value such as filtering, rate limiting and access control. Conceptually, the pNIC can be viewed as an uplink port to the hypervisor and to the physical Ethernet network. The multiple guest OSs, which previously could have been running on separate physical machines (with or without a hypervisor), can in theory communicate with each other through an external Ethernet switch, but cannot since existing Ethernet switches today do not loop the packet back onto the same port on which they arrived to prevent routing loops.

FIG. 1 illustrates an exemplary conventional peripheral component interconnect (PCI) or PCI express (PCIe) hypervisor system 100. A server 102 may contain a central processing unit (CPU) 104 with one or more cores, the CPU coupled to memory 106 such as dynamic random access memory (DRAM). A pNIC 108 allows the server 102 to communicate with a network through a port 110 on a switch such as an Ethernet switch 112. The switch 112 may be coupled to storage devices 114 and other servers 116 (with their own OS) through other ports on the switch. The server 102 may be able to implement one or more guest OSs 118 (any combination of Windows, Linux or other OSs), each running one or more applications. To share the resources of the CPU 104, a hypervisor 120 abstracts the underlying hardware from the guest OSs, and essentially time-shares the OSs with the CPU. vNICs 122 allow the guest OSs 118 to interface with the hypervisor 120 and ultimately the pNIC 108.

If any of the applications running on the guest OSs 118 wants to communicate with a device in the network, packets can be routed through the vNIC 112 of the guest OS, through the pNIC 108, and out to the switch 112 for routing through port 110. On the other hand, if one application wants to communicate with another application running in the same server 102, by definition the guest OSs 118 must still communicate with each other through the normal networking stack. However, because the guest OSs 118 share a common pNIC 108, and because network switches 112 do not allow packets to be looped back onto the same port 110, the hypervisor 120 cannot rely on the network switch so perform the necessary switching.

Because the hypervisor 120 cannot rely on the switch port 110 to do the switching, a virtual switch (vSwitch) 122 can be employed in the hypervisor to connect the vNICs together and perform switching between them. The vSwitch 122 can implement the routing function and route packets from one application to another without needing to involve the pNIC 108 or a network switch 112.

While this approach works well and is scalable to any number of guest OSs (because the vSwitch is essentially software), there is a CPU utilization penalty that is paid for performing memory copies and hypervisor intervention for every input/output (I/O) operation. To route data, data residing in the virtual memory space assigned to the source OS must be copied to the virtual memory space assigned to the destination OS. Media access control (MAC) addresses in the request to transfer data uniquely identify the network adapters of the source and destination virtual machines. However, because the CPU must be involved in all network traffic, CPU utilization suffers as cycles are consumed and are unavailable for running the guest OSs. Also, memory bandwidth is wasted due to the copying step.

FIG. 2 illustrates an exemplary PCIe system 200 with multi-root I/O virtualization (IOV). In FIG. 2, a blade server 202 may have blades 0-15 (identified with reference character 204 in FIG. 2), a shared PCIe switch blade 206, and a shared I/O blade including a pNIC 208. The pNIC may be capable of connecting to an external switch 210 through 10 GB Ethernet ports 212, for example. The pNIC 208 can be coupled through a PCIe interface 214 to the shared PCIe switch, which can then be connected to each of the blades 204 through additional PCIe interfaces 216. Each blade 204 may contain the usual server components such as a CPU, memory such as DRAM, and storage. Each blade may also include a hypervisor 218 for running multiple VMs or guest OSs 220 in each blade. However, in a bladed (multi-root) environment with a shared I/O module (shared pNIC 208 connected to a single Ethernet port as shown in FIG. 2), because a hypervisor vSwitch 222 does not span multiple blades 204, guest OSs 220 across different blades have no means of communicating with each other (while preserving the traditional networking stack).

Shared PCIe switch 206 is where switching between blades and even within blades can occur. Note that the PCIe switch 206 does not contain Ethernet data processing capabilities, and therefore the PCIe switch by itself is not able to handle Ethernet traffic between the server blades.

FIG. 3 illustrates an exemplary PCIe system with single root (SR) IOV. In the example of FIG. 3, which is a single server scenario running a hypervisor 318, each guest OS 320 gets direct access to I/O through PCIe 316 without hypervisor involvement, which improves CPU utilization because the hypervisor 318 doesn't trap network traffic. In this I/O pass-through model where the pNIC 308 is capable of supporting SR IOV and therefore exposes multiple virtual functions (VFs), the hypervisor 318 does not have to act as an intermediary for I/O transactions, and the pNIC 308 is directly exported to the guest OSs as VFs. However, because the hypervisor 318 is not involved, it cannot perform any vSwitch functionality. Therefore, in this embodiment, the switch functionality must reside in either the pNIC 308 or a port in the network switch 310.

Hence, the concept of providing switching functionality within a pNIC is desirable to enable these various models.

SUMMARY OF THE INVENTION

Embodiments of the invention relate to a hardware switch for use with hypervisors and blade servers. The hardware switch enables switching to occur between different guest OSs running in the same server, or between different servers in a multi-root IOV system, or between different guest OSs running in the same server in single-root IOV systems. Whether embedded in a host bus adapter (HBA), converged network adapter (CNA), network interface card (NIC) or other similar device, the hardware switch can provide fast switching with access to and sharing of at least one external network port such as a Fibre Channel (FC) port, 10 Gigabit Ethernet (10 GbE) port, FC over Ethernet (FCoE) port, or other similar port. The hardware switch can be utilized when no hypervisor is present or when one or more servers have hypervisors, because it allows for switching (e.g. Ethernet switching) between the OSs on a single hypervisor.

The hardware switch has some attributes of an Ethernet switch, handles Ethernet data received from a PCIe bus rather than complete Ethernet packets, and forwards Ethernet data either back to the PCIe bus or else for further processing to create Ethernet packets for a 10 GbE physical port. The hardware switch is located in both the ingress and egress datapaths of a pNIC, and performs filtering and lookups based on destination MAC addresses (DMACs or DAs) and virtual LAN (VLAN) numbers and forwards the frame to the appropriate egress port.

A pNIC according to embodiments of the invention includes a PCIe interface, transmit queues (TxQ), receive queues (RxQ), a transmit engine, an Rx engine, a MAC spoofing filter/engine, a receive queue selection and processing engine, the hardware switch, a Tx MAC and an Rx MAC. A set of TxQs and RxQs are each mapped to a particular guest OS and vNIC.

Each hardware switch contains a plurality of ports, referred to as virtual ports (vPorts) and physical ports (pPorts), and routing logic such as a crossbar for making the physical connections between ports. Although implemented in hardware, the vPorts are called "virtual" because they can be configured to be associated with particular guest OSs. The hardware switch can be viewed as comprising two switch functions, one for ingress and one for egress. One switch function includes a plurality of ingress vPorts and one pPort, and the other switch function includes a plurality of egress vPorts and one pPort. Each of the vPorts are exposed to guest OSs running in the server over the PCIe interface through vNICs.

Each vNIC is assigned a set of transmit and receive queues TxQ and RxQ to transmit and receive packets to and from an associated vNIC. Each vNIC is connected to a vPort of the hardware switch. Each of the vPorts and pPorts within the hardware switch can be assigned one of several hardware switch port types. For example, a port having a "tagging" port type takes incoming frames, tags them with a configured VLAN entry, performs a egress port lookup in the T-CAM based on the DA and VLAN number, and then sends it to the appropriate egress port(s) with the VLAN tag inserted. Conversely, a tagging port also removes the VLAN tag from a frame before forwarding it to the final destination receive port. A tagging port allows only one VLAN. If a frame is received with a VLAN tag, the tagging port can be configured to either replace the tag with the configured VLAN tag for this port, or drop the packet. In contrast, a port having an "untagged" port type does not tag the frame, but appends a default VLAN entry to the DA in order to facilitate a lookup in the T-CAM, and then sends it to the appropriate egress port(s). A port having a "trunking" port type receives all types of frames with multiple VLAN tags, and does not perform any enforcement of VLANs, or insert or remove any VLANs.

If an application running on a guest OS wants to transmit a packet to a destination device, a transmit descriptor (TD) is prefetched into the TxQ mapped to that particular guest OS using a TD pre-fetch engine. The TD points to a packet to be transmitted, which is stored in the DRAM. The TD may or may not contain the MAC source address (SA) or vNIC number (also identifies the source), the MAC destination address (DA), and the virtual LAN (VLAN) number. If the SA, vNIC number, DA and VLAN number are present in the TD, they are extracted from the TD using dedicated logic in the transmit engine. If this information is not present in the TD, the packet can be blindly fetched into the Tx packet buffers. The SA, DA and VLAN are extracted from the packet itself as it is being DMA'ed from the host memory DRAM over PCIe to the NIC, and sent to the transmit engine.

Packets that come into an ingress port of the hardware switch (from an internal VNIC) may first be verified by an access control list (ACL) in the MAC spoofing filter/engine to protect against MAC spoofing, based on the vNIC's MAC spoofing (SMAC) and VLAN membership rules, and only then allowed to enter the hardware switch ingress port of the switch. The DA is then applied along with the VLAN number to an egress port lookup ternary content addressable memory (T-CAM) in the switch.

If a T-CAM "hit" occurs, indicating that the destination device is within the server, the DA is applied to a rules RAM (which can also be programmed by the hypervisor) to obtain a routing rule. The routing rule indicates the receive queue (RxQ) to which the packet should be sent. The switch can then be configured using logic and router hardware to route the packet from the Tx packet buffer through the switch and back up to the appropriate RxQ. Additionally, if the packet is a unicast match that does not need any other receive processing, instead of pointing to an internal egress vPort and then doing a further lookup, the hardware switch can be programmed by firmware to point to a destination RxQ and set a bit indicating whether this packet is to be sent to a configurable "sniffer" port or "sniffer" RxQ running in the background. The sniffer port is able to run programs to observe packets passing over the "virtual wire." In this situation, the packet is sent to both these queues. If, however, the packet is a unicast match that requires further receive processing, such as the Microsoft Defined Receive Side Scaling Toeplitz (RSS) hash, then in order to select an RxQ, it points to a vPort index. The vPort index is then used to do a lookup which then further clarifies the type of processing (fields, masks and hash) to be performed to select an RxQ. If the packet is a multicast match that requires the packet to go to multiple destinations, a vector tuple is given. The first vector is a vPort vector and the second port is a RxQ vector. A bit in the vPort vector indicates that for that port, the processing must be done as specified for that vPort. A bit set in the RxQ vector encodes the number of the RxQ to which the packet is destined. Hardware does not perform checking to resolve between the vPort vector and the RxQ vector. It is up to firmware to set these bits correctly.

A T-CAM "miss" can occur if the DA is a broadcast address, or if the DA is a unicast address for a destination device that is not within the server. If a T-CAM miss due to a broadcast address occurs, the VLAN ID is encoded to the internal VLAN number, and the VLAN number is applied to a multicast table or data structure. Each entry in the table represents a different destination, such as pPort (the physical port through which packets are sent out to the network) or a vPort (the virtual port through which packets are sent out to other hypervisor vSwitches in different blades, for example). The lookup results in a vector tuple. The first vector is a vPort vector and the second port is a RxQ vector. A bit in the vPort vector indicates that for that port, the processing must be done as specified for that vPort. A bit set in the RxQ vector encodes the number of the RxQ to which the packet is destined. For every entry in the table indicating a valid destination, the switch is configured so that the packet is multi-cast to those destinations. The data is then fetched from the DRAM and transferred to a Tx packet buffer, where it is then sent out to the one or more destinations, except the same vPort's RxQ to avoid loops.

If a T-CAM miss due to a unicast address occurs, the same process above is repeated and the packet is sent to the appropriate port or RxQ. For a frame that is not a part of the VLAN, a default VLAN tag is applied and the packet can be sent to the appropriate ports or RxQs pointed to by the default VLAN entry egress vector tuple.

BRIEF DESCRIPTION OF THE DRAWINGS

FIG. 5 illustrates an exemplary DRAM memory space and an improvement in data transfer according to embodiments of the invention.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Embodiments of the invention relate to a hardware switch for use with hypervisors and blade servers. The hardware switch enables switching to occur between different guest OSs running in the same server, or between different servers in a multi-root IOV system, or between different guest OSs running in the same server in single-root IOV systems. Whether embedded in a host bus adapter (HBA), converged network adapter (CNA), network interface card (NIC) or other similar device, the hardware switch can provide fast switching with access to and sharing of at least one external network port such as a Fibre Channel (FC) port, 10 Gigabit Ethernet (10 GbE) port, FC over Ethernet (FCoE) port, or other similar port. By comparison, an external Ethernet switch would require a separate HBA, CNA, or NIC for each server, but moreover would not allow the switching out and back through the same port that would be necessary in order to support Ethernet switching between OSs on a single hypervisor.

The hardware switch can be utilized when no hypervisor is present or when one or more servers have hypervisors, because it allows for switching (e.g. Ethernet switching) between the OSs on a single hypervisor. The hardware switching is faster than virtual switch (i.e. software) implementations that are often included in the hypervisor itself, consumes less power and space, and can provide improved functionality as compared to a PCIe switch, because PCIe switches will not allow for the use of standard Ethernet software stacks to control transfers between servers connected to PCIe ports of the switch.

Although embodiments of the invention may be described and illustrated herein in terms of PCIe hypervisor systems and Ethernet networks, it should be understood that embodiments of this invention are not so limited, but are additionally applicable to any hypervisor systems implementing multiple guest OSs using any type of bus protocol, or any other host CPU attach communication protocol, and any type of networking protocol.

Figure 1:
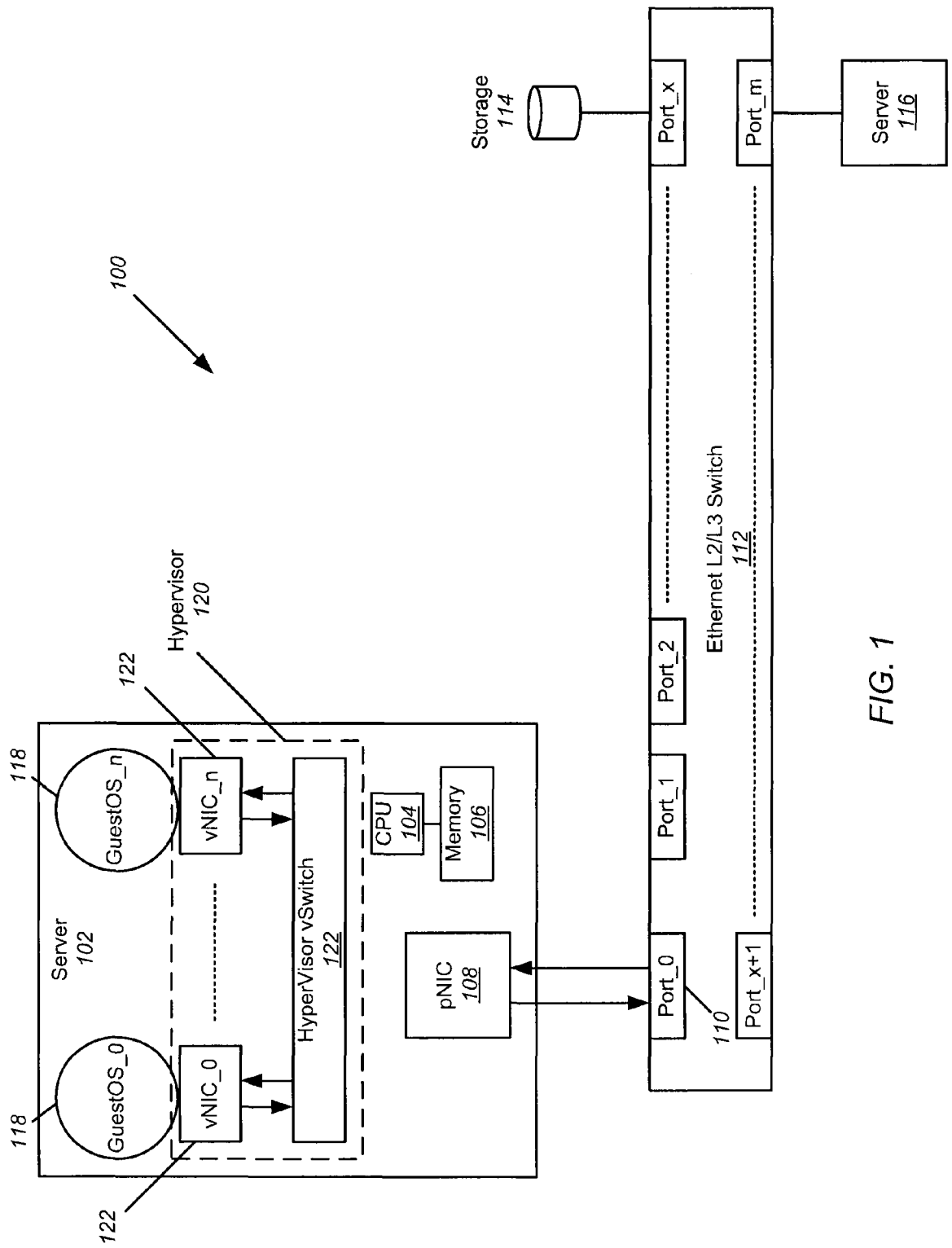
FIG. 1 illustrates an exemplary conventional peripheral component interconnect (PCI) or PCI express (PCIe) hypervisor system.
Figure 2:
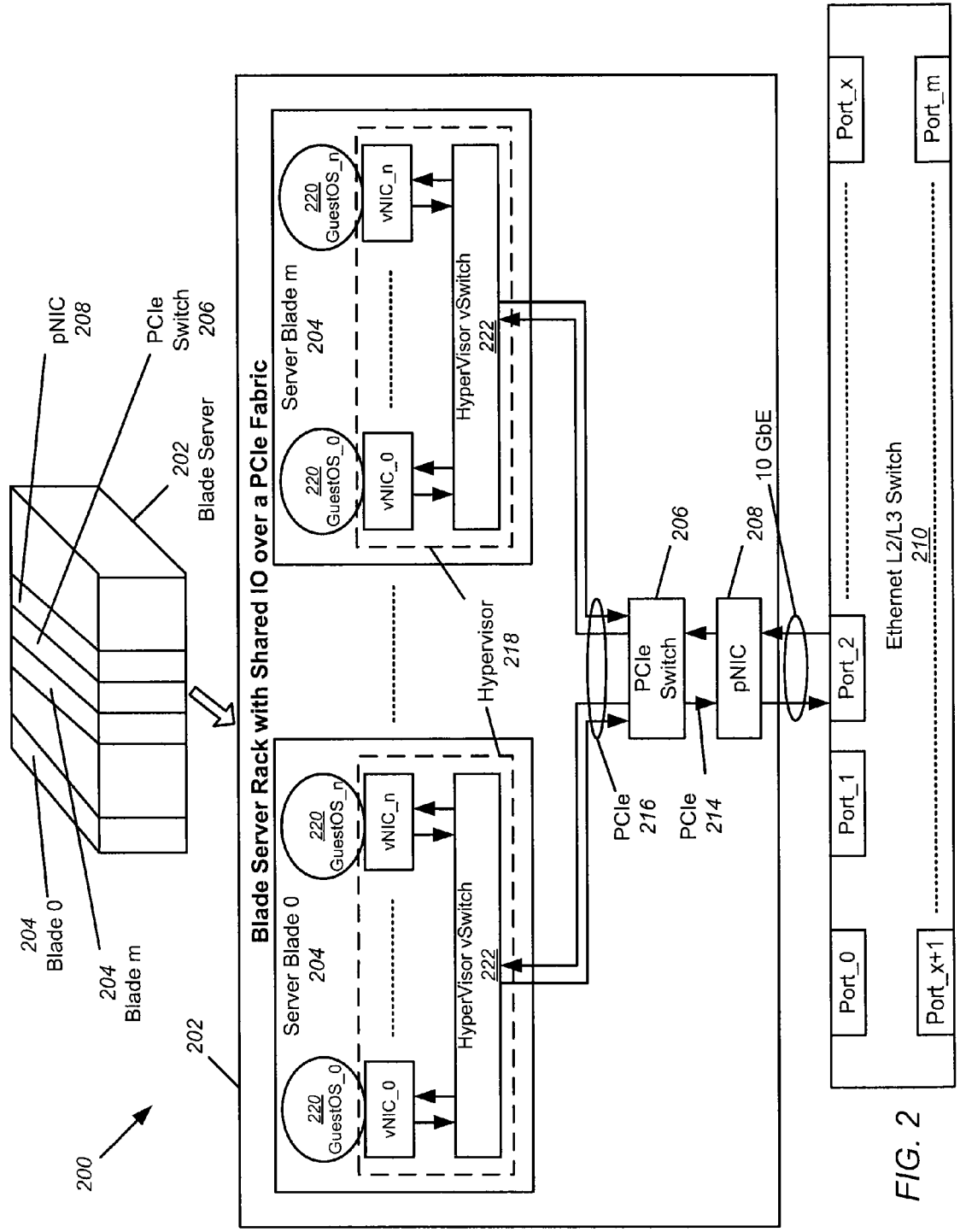
FIG. 2 illustrates an exemplary PCIe system with multi-root I/O virtualization (IOV).
Figure 3:
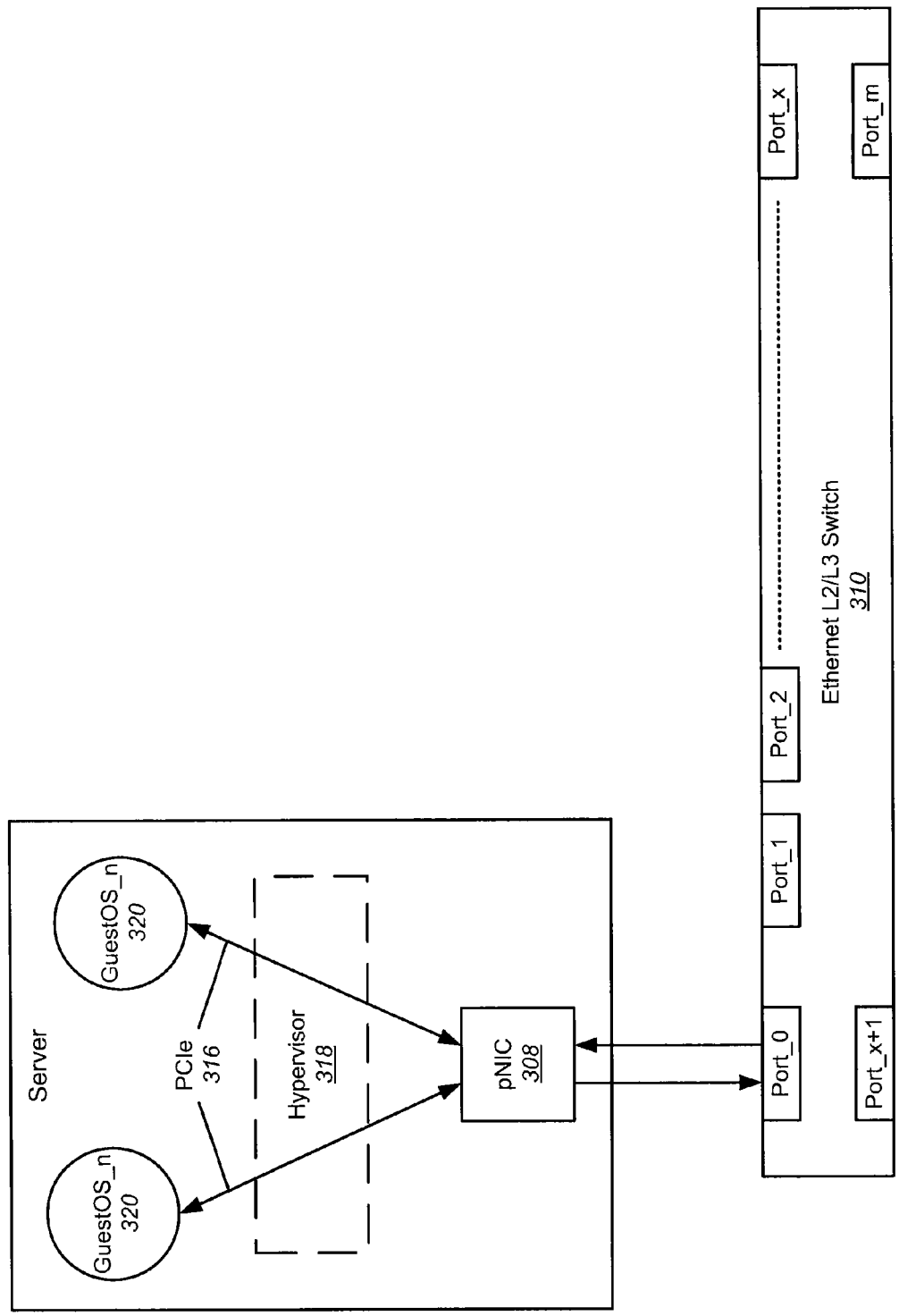
FIG. 3 illustrates an exemplary PCIe system with single root (SR) IOV.
Figure 4A:
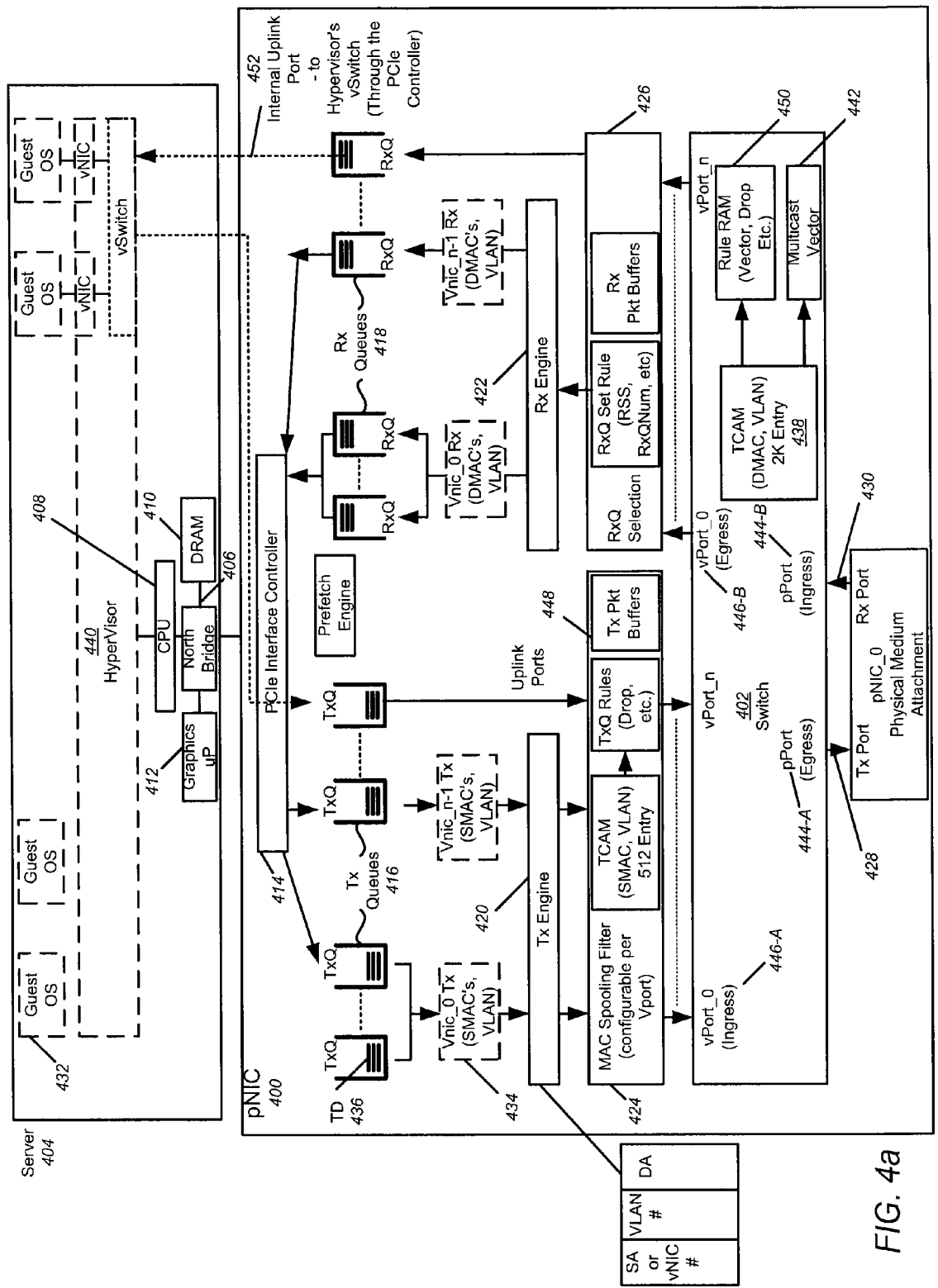
FIG. 4a illustrates an exemplary pNIC including a hardware switch according to embodiments of the invention.

FIG. 4a illustrates an exemplary pNIC 400 including a hardware switch 402 according to embodiments of the invention. The hardware switch 402 has some attributes of an Ethernet switch, but does not provide packet switching or routing, in that it handles Ethernet data received from a PCIe bus rather than complete Ethernet packets, and does not forward packets from one physical network port to one of several other network ports, but instead forwards Ethernet data either back to the PCIe bus or else for further processing to create Ethernet packets for a 10 GbE physical port.

The hardware switch 402 is located in both the ingress and egress datapaths of the pNIC, and performs filtering and lookups based on destination MAC addresses (DMACs or DAs) and virtual LAN (VLAN) numbers and forwards the frame to the appropriate egress port. In the example of FIG. 4a, the pNIC 400 is coupled to a server 404. Server 404 may contain a North Bridge 406, CPU 408, memory such as DRAM 410, a graphics processor 412, and the like.

The pNIC 400 includes a PCIe interface 414, transmit queues (TxQ) 416, receive queues (RxQ) 418, a transmit engine 420, an Rx engine 422, a MAC spoofing filter/engine 424, a receive queue selection and processing engine 426, the hardware switch 402, a Tx MAC 428 and an Rx MAC 430. A set of TxQs 416 and RxQs 418 are each mapped to a particular guest OS 432 and vNIC 434. Each of the blocks in pNIC 400 can be implemented using hardware such as gates, flip-flops, multiplexers, registers, engines, memory and the like.

Each hardware switch 402 contains a plurality of ports, referred to as virtual ports (vPorts) and physical ports (pPorts), and routing logic such as a crossbar for making the physical connections between ports. Although implemented in hardware, the vPorts are called "virtual" because they can be configured to be associated with particular guest OSs. In the example of FIG. 4a, hardware switch 402 can be viewed as comprising two switch functions, one for ingress and one for egress. One switch function includes a plurality of ingress vPorts 446-A (e.g 128 vPorts) and one pPort 444-A, and the other switch function includes a plurality of egress vPorts 446-B (e.g. 128 vPorts) and one pPort 444-B. Each of the vPorts 446-A and 446-B are exposed to guest OSs 432 running in the server 404 over the PCIe interface 414 through vNICs 434. A vNIC is a conceptual entity in the hypervisor that is represented by at least one of each TxQ and one RxQ and RBQ and other state elements in gates/memory in the pNIC.

Each vNIC 434 is assigned a set of transmit and receive queues TxQ 416 and RxQ 418 (among other queues) to transmit and receive packets to and from an associated vNIC 434. These queues can be implemented from registers. Each vNIC is connected to a vPort 446 of the hardware switch 402.

Furthermore, the vPorts 446-B can also be "internal" uplink ports 452 that connect to a traditional hypervisor virtual switch. In other words, when a broadcast is performed on a VLAN, if this internal uplink port is a part of the VLAN, the broadcast packets go to this uplink port as well.

Each of the vPorts 446 and pPorts 444 within the hardware switch 402 can be assigned one of several hardware switch port types. For example, a port having a "tagging" port type takes incoming untagged frames, tags them with a configured VLAN_ID, performs a egress port lookup in the T-CAM 438 based on the DA and VLAN_ID, and then sends it to the appropriate egress port(s) with the VLAN tag inserted. Conversely, a tagging port also removes the VLAN tag from a frame before forwarding it to that port. A tagging port allows only one VLAN_ID. If a frame is received with a VLAN tag, the tagging port can be configured to either replace the tag with the configured VLAN_ID for this port, or drop the packet. In contrast, a port having an "untagged" port type does not tag the frame, but appends a default VLAN_ID to the DA in order to facilitate a lookup in the T-CAM 438, and then sends it to the appropriate egress port(s). A port having a "trunking" port type receives all types of frames with multiple VLAN tags, and does not insert or remove any VLAN tags.

If an application running on a guest OS 432 wants to transmit a packet to a destination device, a transmit descriptor (TD) 436 is prefetched from the TxQ 416 mapped to that particular guest OS 432 using a TD pre-fetch engine. The TD 436 points to a packet to be transmitted, which is stored in the DRAM 410. The TD 436 may or may not contain the MAC source address (SA) or vNIC number (also identifies the source), the MAC destination address (DA), and the virtual LAN number (VLAN_ID). If the SA, vNIC number, DA and VLAN_ID are present in the TD 436, they are extracted from the TD using dedicated logic in the transmit engine 420. If this information is not present in the TD, the packet can be blindly fetched into the Tx packet buffers 448. The SA, DA and VLAN_ID are extracted from the packet itself as it is being DMA'ed from the host memory DRAM over PCIe to the NIC, and sent to the transmit engine 420.

Packets that come into an ingress port 446-A of the hardware switch 402 (from an internal vNIC 434) may first be verified by an access control list (ACL) in the MAC spoofing filter/engine 424 to protect against MAC spoofing, based on the vNIC's MAC spoofing (SMAC) and VLAN membership rules, and only then allowed to enter the hardware switch ingress port 446-A of the switch 402. The DA is then applied along with the VLAN_ID to an egress port lookup ternary content addressable memory (T-CAM) 438 in the switch 402. The T-CAM is programmed in a way that implies automatic priority and the longest prefix match is the index that is received. Note that in some embodiments, the egress port lookup T-CAM 438 can be programmed by the hypervisor 440.

If a T-CAM "hit" occurs, indicating that the destination device is within the server 404, the result is applied to a rules RAM 450 (which can also be programmed by the hypervisor 440) to obtain a routing rule. The routing rule indicates the receive queue (RxQ) 418 to which the packet should be sent. The switch 402 can then be configured using logic and router hardware to route the packet from the Tx packet buffer 448 through the switch 402 and back up to the appropriate RxQ 418. Additionally, if the packet is a unicast match that does not need any other receive processing, instead of pointing to an internal egress vPort 446-B and then doing a further lookup, the hardware switch can be programmed by firmware to point to a destination RxQ 418 and set a bit indicating whether this packet is to be sent to a configurable "sniffer" port or "sniffer" RxQ running in the background. The sniffer port is able to run programs to observe packets passing over the "virtual wire." In this situation, the packet is sent to both these queues. If, however, the packet is a unicast match that requires further receive processing, such as the Microsoft Defined Receive Side Scaling Toeplitz (RSS) hash, then in order to select an RxQ, it points to a vPort index. The vPort index is then used to do a lookup which then further clarifies the type of processing (fields, masks and hash) to be performed to select an RxQ. If the packet is a multicast match that requires the packet to go to multiple destinations, a vector tuple is given. The first vector is a vPort vector and the second port is a RxQ vector. A bit in the vPort vector indicates that for that port, the processing must be done as specified for that vPort. A bit set in the RxQ vector encodes the number of the RxQ to which the packet is destined. Hardware does not perform checking to resolve between the vPort vector and the RxQ vector. It is up to firmware to set these bits correctly.

It is to be noted that normally, a packet that arrives at a given vPort from a vNIC (TxQ) does not go back out the same vPort to the same vNIC (RxQ). However, for testing/diagnostic purposes this "loopback" function is allowed.

A T-CAM "miss" can occur if the DA is a broadcast address, or if the DA is a unicast address for a destination device that is not within the server 404. Note that broadcast addresses are well known and must result in the T-CAM miss. A T-CAM entry should not be reserved for a broadcast address. Hardware can check for this before performing a T-CAM lookup, and if the DA is determined to be a broadcast address, the hardware can generate a signal indicative of an implicit T-CAM miss.

If a T-CAM miss due to a broadcast address occurs, the VLAN ID is encoded to the internal VLAN number, and the VLAN number is applied to a broadcast and a multicast vector table or data structure 442 (efficiently sized at perhaps 128 bits), which can also be programmed by the hypervisor 440. Each entry in the table 442 represents a different destination, such as pPort 444 (the physical port through which packets are sent out to the network) or a vPort 446 (the virtual port through which packets are sent out to other hypervisor vSwitches in different blades, for example). The lookup results in a vector tuple. The first vector is a vPort vector and the second port is a RxQ vector. A bit in the vPort vector indicates that for that port, the processing must be done as specified for that vPort. A bit set in the RxQ vector encodes the number of the RxQ to which the packet is destined. For every entry in the table 442 indicating a valid destination, the switch 402 is configured so that the packet is multi-cast to those destinations. Thus, for example, the packet could be sent out the pPort 444 and a number of hypervisor vSwitches through a number of vPorts 446 at the same time. The data is then fetched from the DRAM 410 and transferred to a Tx packet buffer 448, where it is then sent out to the one or more destinations, except the same vPort's RxQ to avoid loops.

If a T-CAM miss due to a unicast address occurs, the same process above is repeated and the packet is sent to the appropriate port or RxQ. For a frame that is not a part of the VLAN, a default VLAN tag is applied and the packet can be sent to the appropriate ports or RxQs pointed to by the default VLAN entry egress vector tuple.

Figure 4B:
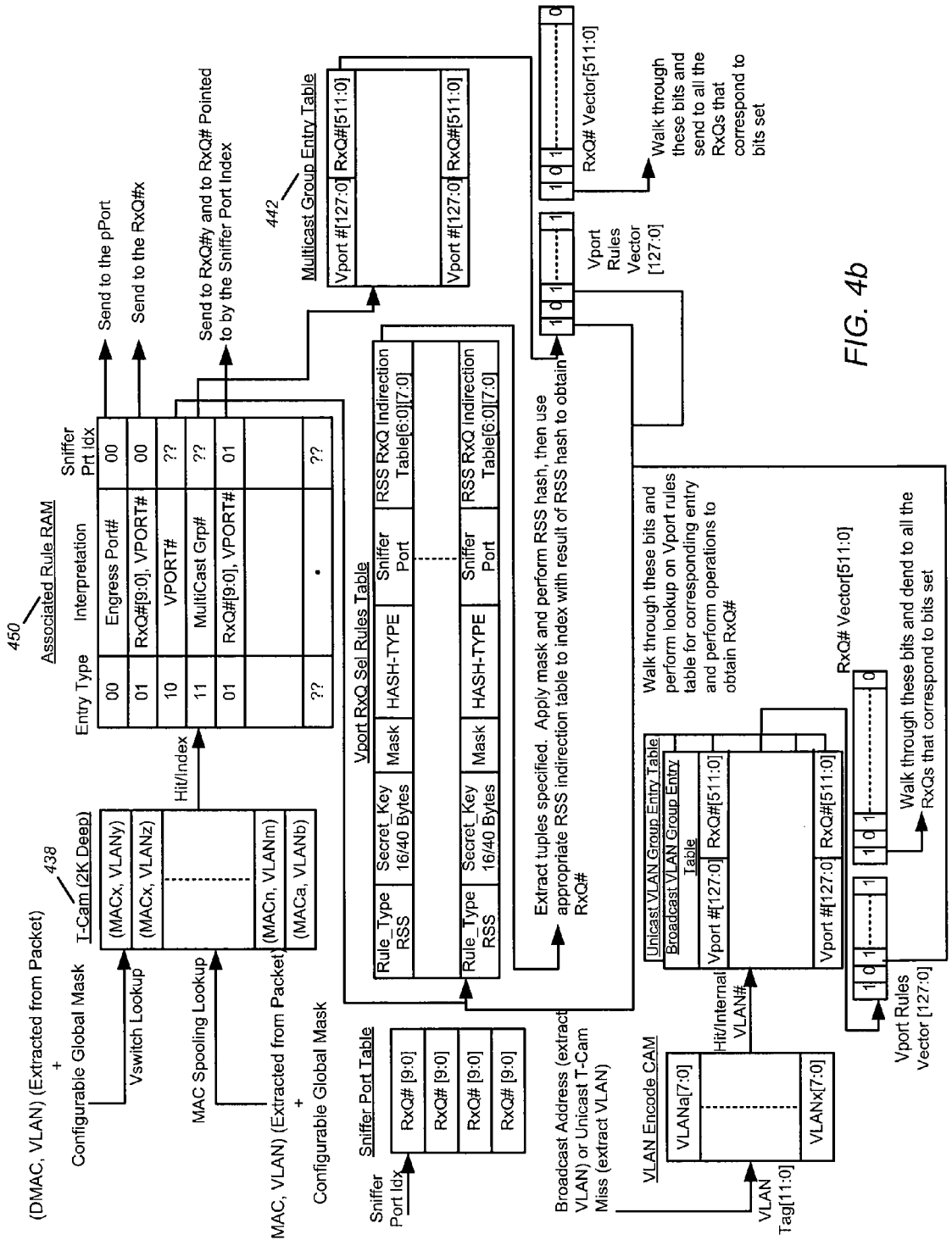
FIG. 4b illustrates an exemplary implementation that uses a T-CAM lookup for packet switching, covering both T-CAM hit and T-CAM miss processing sequences as described above according to embodiments of the invention.

FIG. 4*b* illustrates an exemplary T-CAM hit processing sequence and a T-CAM miss processing sequence as described above according to embodiments of the invention. It should be understood that although a T-CAM, rules RAM, and multi-cast table have been described herein, other functionally similar hardware configurations may be used.

If a source device from the network sends a request to the server 404 that is received through the Rx MAC 430, the SA, DA and VLAN_ID are extracted in the switch 402, and the DA is applied to the egress port lookup T-CAM 438 and processed as described above.

In some embodiments of the invention, the hardware switch can "learn" and automatically fill in the T-CAM without pre-programming by a hypervisor. As described above, the T-CAM contains a listing of destination MAC addresses (DAs) accessible within the server. However, in some embodiments of the invention, the DA entries in the T-CAM can be acquired over time. As traffic is received into the vPorts and pPorts of the hardware switch ports, the source address (SA) and the port it was received on are updated in the T-CAM, creating an association of a particular device to a particular port. Over time, the association of a number of devices to ports can be learned. This information can be used to complete the T-CAM so that in the future, a particular DA will be associated with a particular port. If a packet is received having a DA that has not yet been stored in the T-CAM, the packet can be broadcast to all the uplink vPorts and the pPort. Packets are never sent back on the port (vPort or pPort) that they arrived.

In further embodiments, a timer can be associated with each DA in the T-CAM. When the timer reaches a time-out condition, the DA is removed from the T-CAM (the DA is "aged-out" or made stale) to guard against the removal of the device from its associated port. After the DA is aged out, the device will not be re-associated with a port until a packet is received from the device with the SA of the device.

In still other embodiments, routing may be performed using IP addresses instead of MAC addresses. When a TD is stored in a transmit queue, a source IP address is extracted in addition to or instead of the source MAC address. The T-CAM utilizes a destination IP address in addition to or instead of the destination MAC address.

FIG. 5 illustrates an exemplary DRAM memory space 500 and an improvement in data transfer according to embodiments of the invention. In a conventional hypervisor system, a guest OS accesses a guest virtual memory address, which is mapped to a guest physical memory address. The guest physical memory address is mapped to a machine physical address, which is basically the memory space 500 of all the DRAMs in the server. In this example, suppose a particular machine physical (DRAM) address 502 contains data associated with guest OS_0, and now guest OS_0 wants to pass this data to guest OS_1, within the same server as guest OS_0. A TD 504 is placed in a TxQ 506 associated with guest OS_0, including a pointer to the data. In this particular example, there is no reason to take the data 502 out of the machine physical address for guest OS_0 and move it to a different machine physical address for guest OS_1, when all that is necessary is to move the pointer for guest OS_0 to guest OS_1 and/or change the "ownership" of the machine physical addresses from guest OS_0 to guest OS_1. Therefore, in some embodiments of the invention, an I/O or other memory management unit (MMU) 508 and other appropriate entities can be programmed by the hypervisor to be aware of such translations and move the data pointer from the TxQ 506 of guest OS_0 to the RxQ 508 of guest OS_1 while effecting the change in "ownership" of the memory. This can be accomplished without wasting any memory or PCIe bandwidth.

Figure 6:
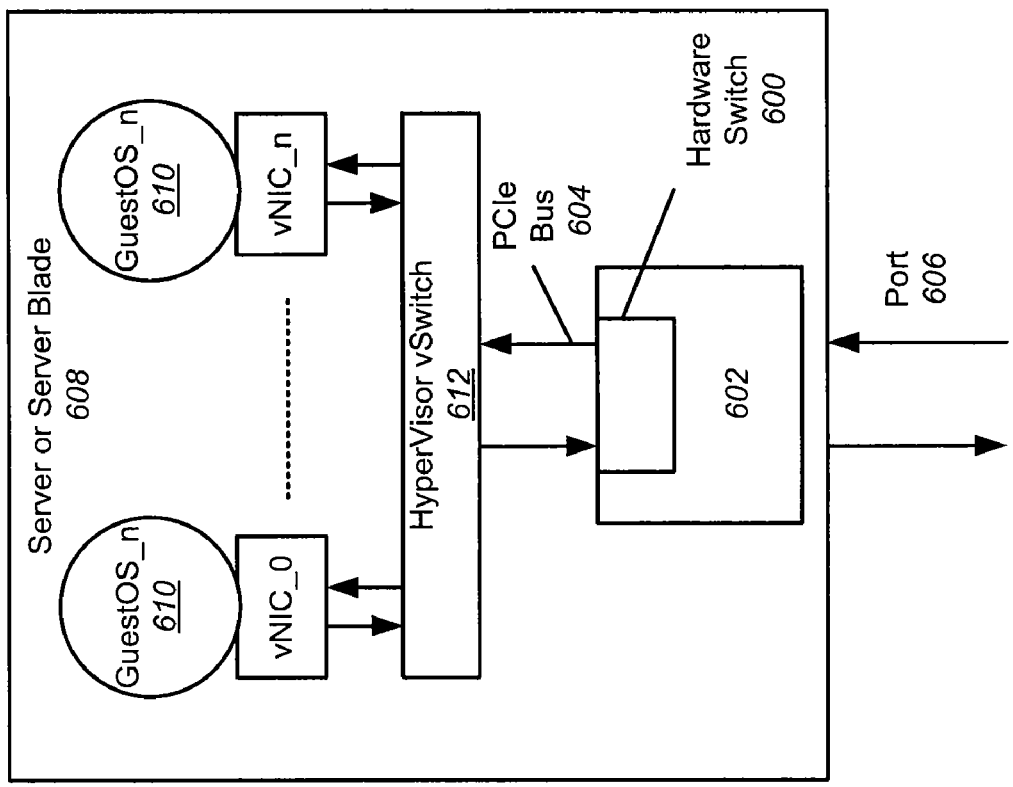
FIG. 6 illustrates a hardware switch incorporated into an adapter within an exemplary server or server blade for enabling communication between one or more guest OSs and devices on a network through a port according to embodiments of the invention.

FIG. 6 illustrates a hardware switch 600 incorporated into an adapter 602 within an exemplary server or server blade 608 for enabling communication between one or more guest OSs 610 and devices on a network through a port 606 according to embodiments of the invention. In some embodiments, the adapter 602 represents a converged network adapter (CNA) and the port 606 represents a 10 Gbps Ethernet (10 GbE) port. The CNA can be fabricated as a single integrated chip which connects to a PCIe bus 604 that sends and receives FCOE packets through the 10 GbE port. The CNA can be located on a mezzanine card mounted on a server processor blade, or it can be fit into a PCIe connector on a stand alone (or rack) server.

In FIG. 6, the hypervisor vSwitch 612 is a part of the software on the server or server blade 608. However, the presence of the hardware switch 600 can allow the hardware switch to be used instead of the hypervisor vSwitch 612. Absent the hardware switch 600, the hypervisor vSwitch 612 would be used as an Ethernet switch to switch Ethernet packets between the Guest OS systems 610, such as between GuestOS_0 and GuestOS_n. With the hardware switch 600 according to embodiments of the invention, the hypervisor vSwitch 612 is not used for such switching, and instead the GuestOSs 610 communicates through the PCIe bus 604 to the hardware switch 600, which can then exchange Ethernet data between the GuestOSs 610.

In other embodiments, the adapter 602 represents an HBA and the port 606 represents an 8 Gbps FC port. The HBA connects to a PCIe bus 604 and sends and receives FC frames over the 8 Gbps FC port and may switch FC packets internally between guest OSs. In other embodiments, the adapter 602 represents a NIC and the port 606 represents a 10 GbE port. The NIC connects to a PCIe bus and sends and receives Ethernet packets over a 10 GbE port.

Figure 7:
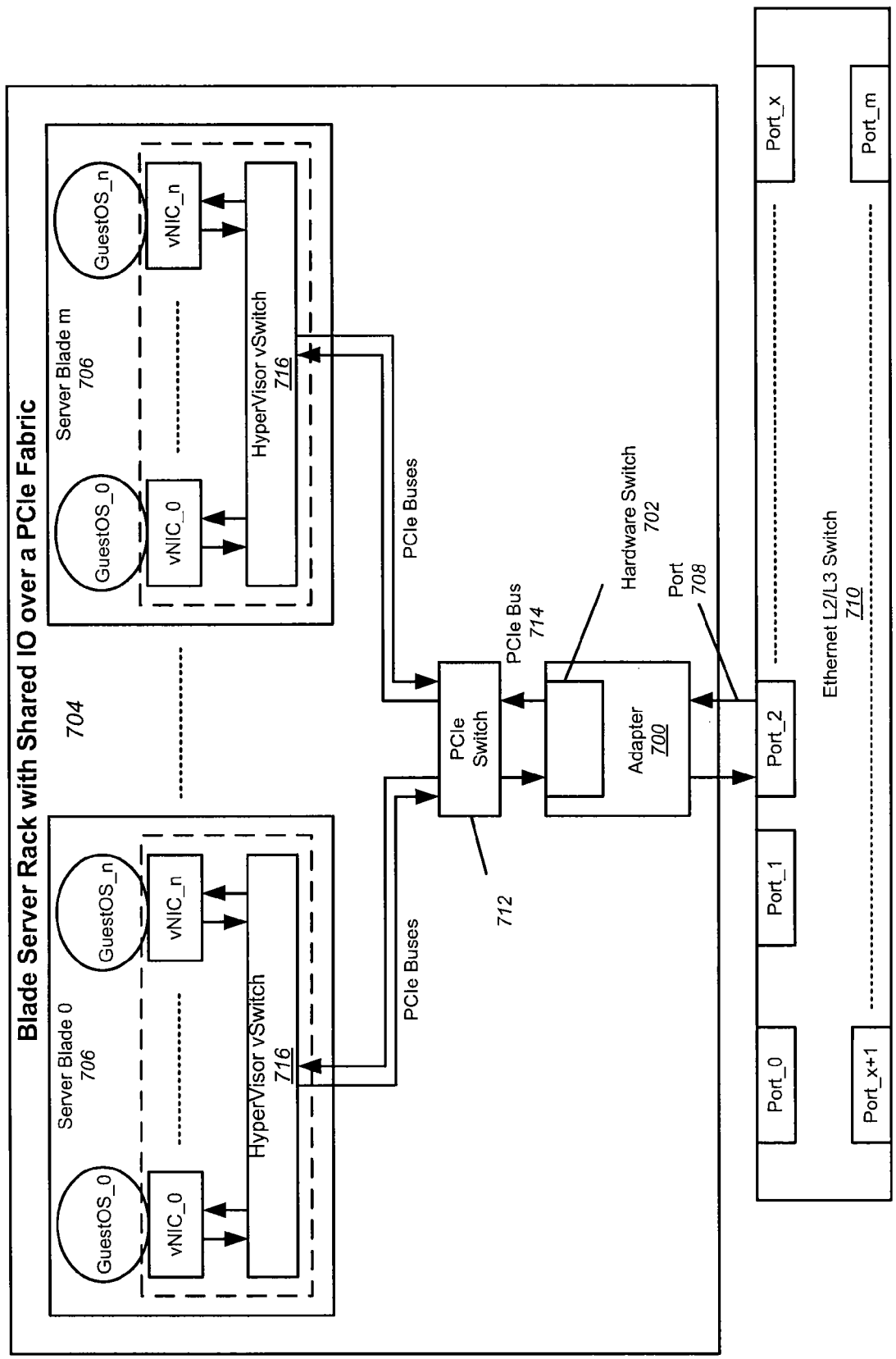
FIG. 7 illustrates an adapter containing a hardware switch incorporated into an exemplary blade server according to embodiments of the invention.

FIG. 7 illustrates an adapter 700 containing a hardware switch 702 incorporated into an exemplary blade server 704 according to embodiments of the invention. In some embodiments, adapter 700 is a CNA, and port 708 is a 10 GbE port. The hardware switch 702 in the CNA allows Ethernet data to move between the server blades 706 (which contain processors and operating systems) without having to go through the 10 GbE port 708, and without having to go through the external Ethernet switch 710 (although even Port_2 in the Ethernet switch 710 will not allow such traffic since Ethernet switches generally prohibit traffic from looping back through the same port). For example, if there is a need to have Ethernet traffic between GuestOS_0 on Server Blade 0 and GuestOS_n on Server Blade m, the traffic would flow through the PCIe switch 712 to the hardware switch 702, which effectively causes traffic to loop back through PCIe bus 714 and through the PCIe switch 712 to the server blades 706. Note that the PCIe switch does not contain Ethernet data processing capabilities, and therefore the PCIe switch by itself is not able to handle Ethernet traffic between the server blades. The PCIe switch can be from one of several suppliers, such as Integrated Device Technology (IDT), PLX Technology (PLX), or NextIO. The PCIe switch needs to be a multi-root IOV aware switch. The system of FIG. 7 produces a fast process for handling Ethernet traffic between server blades 706. Even if no hypervisors 716 are contained on the server blades 706 of FIG. 7, and each blade processor is running only a single OS, the hardware switch 702 can perform an important function in enabling the flow of Ethernet traffic between the different server blades in the blade chassis. The PCIe switch 712 and CNA 700 shown in FIG. 7 can be packaged together in a subassembly that mounts into one of the blade server chassis slots. The subassembly can then be used as a part of a network with storage and other capabilities. It should be noted that in other embodiments, adapter 700 can be a FC HBA or Ethernet NIC in which the hardware switch 702 performs the same function as described above.

Figure 8:
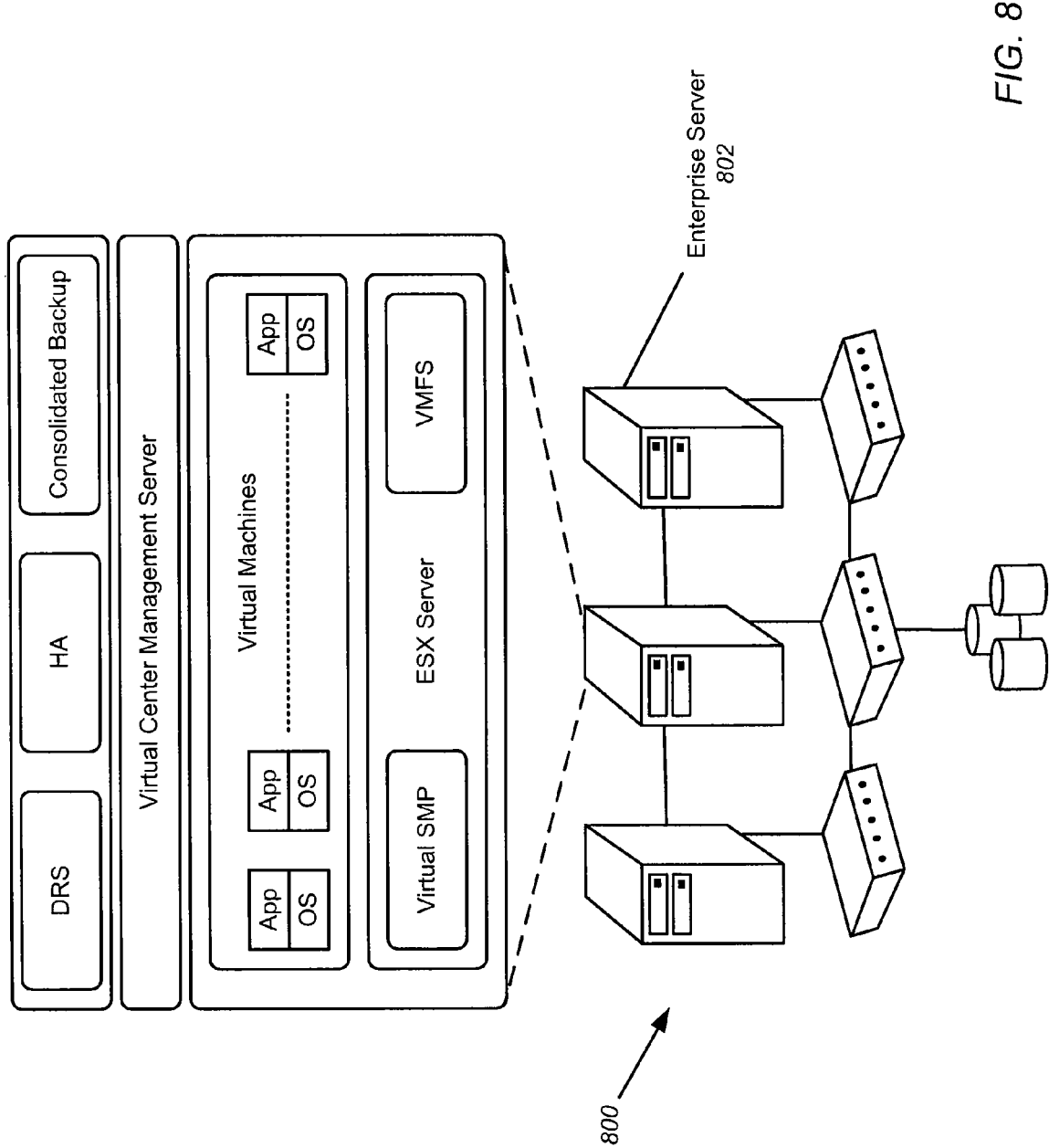
FIG. 8 illustrates an enterprise server network that can include the hardware switches according to embodiments of the invention.

FIG. 8 illustrates an enterprise server network 800 that can include the hardware switches according to embodiments of the invention. A CNA using the hardware switch according to embodiments of the invention could be used in any of the Enterprise Servers 802 shown in FIG. 8. Although these enterprise servers 802 are shown as separate enclosures, they could be blades in a blade server chassis.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A hardware switch for enabling communications with one or more guest operating systems (OSs) in one or more servers, comprising:
   a first memory configured for receiving a destination address (DA) and determining if the DA is accessible through the one or more servers;
   a second memory coupled to the first memory and configured for receiving the DA and generating a routing rule to specify a route for the hardware switch if the DA is found in the first memory;
   a third memory coupled to the first memory and configured for receiving a virtual local area network identifier (VLAN_ID) and generating a vector to specify a set of destination ports for the hardware switch if the DA is not found in the first memory;
   a fourth memory to configure a set of ports within a given VLAN to be used by the hardware switch for broadcast media access control (MAC) DAs; and
   a plurality of virtual ports (vPorts) implemented in hardware, each of one or more of the vPorts configured to be associated with a particular guest OS.

2. The hardware switch of claim 1, further comprising:
   a plurality of physical ports (pPorts) configured to provide network access.

3. The hardware switch of claim 2, the hardware switch configured for receiving data from a peripheral component interconnect express (PCIe) bus, or any other host CPU attach communication protocol, through a vPort and selectively routing the data back to the PCIe bus or creating packets for transmission through a pPort.

4. The hardware switch of claim 2, the vPorts and pPorts configured as having either a tagging port type for inserting or removing VLAN_IDs from incoming frames, an tagged port type for associating a default VLAN_ID with incoming frames, or a trunking port type.

5. The hardware switch of claim 1, the hardware switch embedded in ingress and egress paths of a physical network interface card (pNIC).

6. The hardware switch of claim 5, the pNIC further comprising a prefetch engine to prefetch transmit descriptors (TDs) from a guest OS into a transmit (Tx) queue.

7. The hardware switch of claim 6, the TD including a source address (SA), destination address (DA), and VLAN number.

8. The hardware switch of claim 7, the first memory comprising an egress port content addressable memory (CAM), the CAM being configured for receiving the VLAN number in addition to the DA to determine whether the DA is accessible through the one or more servers.

9. The hardware switch of claim 8, the CAM configured to be programmable by a hypervisor in one of the servers.

10. The hardware switch of claim 5, the pNIC further including a media access control (MAC) spoofing filter/engine configured for filtering packets using an access control list (ACL).

11. The hardware switch of claim 1, the second memory comprising a rules random access memory (RAM) for providing a vector tuple including a virtual port (vPort) vector and a receive queue (RxQ) vector if the first memory determines that a received packet is a multicast match.

12. The hardware switch of claim 1, the third memory comprising a multicast table, each entry in the multicast table representing a different destination port.

13. The hardware switch of claim 1, further comprising logic configured for self-generating entries in the first memory as traffic is received by extracting a source address (SA) and noting a port at which the traffic was received.

14. The hardware switch of claim 1, the hardware switch incorporated into a server.

15. The hardware switch of claim 1, the hardware switch incorporated into a blade server.

16. The hardware switch of claim 1, the hardware switch incorporated into a multi-root input/output virtualization (IOV) system.

17. The hardware switch of claim 1, the hardware switch incorporated into a single-root input/output virtualization (IOV) system.

18. The hardware switch of claim 1, the hardware switch incorporated into a host bus adapter (HBA).

19. The hardware switch of claim 1, the hardware switch incorporated into a converged network adapter (CNA).

20. The hardware switch of claim 1, the hardware switch incorporated into a network interface card (NIC).

21. A method within a physical network interface card (pNIC) for enabling communications with one or more guest operating systems (OSs) in one or more servers, comprising:
   receiving a destination address (DA) and determining if the DA is accessible through the one or more servers;
   generating a routing rule to specify a route if the DA is accessible through the one or more servers;
   receiving a virtual local area network (VLAN) number and generating a tuple to specify a broadcast route if the DA not accessible through the one or more servers; and
   providing a plurality of virtual ports (vPorts) implemented in hardware, each of one or more of the vPorts associated with a particular guest OS.

22. The method of claim 21, further comprising:
   providing a plurality of physical ports (pPorts) for network access.

23. The method of claim 22, further comprising receiving data from a peripheral component interconnect express (PCIe) bus through a vPort and selectively routing the data back to the PCIe bus or creating packets for transmission through a pPort.

24. The method of claim 22, further comprising assigning the vPorts and pPorts either a tagging port type for tagging VLAN numbers to or removing VLAN numbers from incoming frames, an untagged port type for appending a default VLAN entry to incoming frames, or a trunking port type.

25. The method of claim 21, further comprising prefetching a transmit descriptor (TD) from a guest OS, the TD including a source address (SA), the DA, and VLAN number.

26. The method of claim 25, wherein receiving a DA comprises receiving the VLAN number and the DA into an egress port content addressable memory (CAM) to determine whether the DA is accessible through the one or more servers.

27. The method of claim 26, further comprising programming the CAM using a hypervisor in one of the servers.

28. The method of claim 21, further comprising filtering received packets using an access control list (ACL).

29. The method of claim 21, wherein generating a routing rule comprises providing a vector tuple including a virtual port (vPort) vector and a receive queue (RxQ) vector from a rules random access memory (RAM) if a received packet is a multicast match.

30. The method of claim 21, further comprising self-generating data used for determining if the DA is accessible through the one or more servers as traffic is received by extracting a source address (SA) and noting a port at which the traffic was received.

31. The method of claim 21, further comprising generating communication paths between different guest OSs running in the same server.

32. The method of claim 21, further comprising generating communication paths between different guest OSs running in different server blades of a blade server.

33. A storage area network (SAN) including one or more servers, at least one of the servers having a physical network interface card (pNIC) including a hardware switch for enabling communications with one or more guest operating systems (OSs) in one or more of the servers, the hardware switch comprising:
- a first memory configured for receiving a destination address (DA) and determining if the DA is accessible through the one or more servers;
- a second memory coupled to the first memory and configured for receiving the DA and generating a routing rule to specify a route for the hardware switch if the DA is found in the first memory;
- a third memory coupled to the first memory and configured for receiving a virtual local area network (VLAN) number and generating a tuple to specify a broadcast route for the hardware switch if the DA not found in the first memory; and
- a plurality of virtual ports (vPorts) implemented in hardware, each of one or more of the vPorts configured to be associated with a particular guest OS.

* * * * *